(12) United States Patent
Seeger et al.

(10) Patent No.: US 9,891,053 B2
(45) Date of Patent: Feb. 13, 2018

(54) MEMS DEVICE WITH IMPROVED SPRING SYSTEM

(71) Applicant: InvenSense, Inc., San Jose, CA (US)

(72) Inventors: Joseph Seeger, Menlo Park, CA (US); Ozan Anac, Oakland, CA (US)

(73) Assignee: INVENSENSE, INC., San Jose, CA (US)

( * ) Notice: Subject to any disclaimer, the term of this patent is extended or adjusted under 35 U.S.C. 154(b) by 0 days.

(21) Appl. No.: 14/800,612

(22) Filed: Jul. 15, 2015

(65) Prior Publication Data

US 2015/0316379 A1 Nov. 5, 2015

Related U.S. Application Data

(60) Division of application No. 13/361,261, filed on Jan. 30, 2012, now Pat. No. 9,097,524, which is a continuation-in-part of application No. 12/558,398, filed on Sep. 11, 2009, now Pat. No. 8,534,127.

(60) Provisional application No. 61/553,031, filed on Oct. 28, 2011.

(51) Int. Cl.
*G01C 19/00* (2013.01)
*G01C 19/5755* (2012.01)
*G01C 19/5733* (2012.01)

(52) U.S. Cl.
CPC ..... *G01C 19/5755* (2013.01); *G01C 19/5733* (2013.01)

(58) Field of Classification Search
CPC ............... G01C 19/56; G01C 19/5719; G01C 19/5755; G01C 19/5656; G01C 19/5621; G01C 19/5642; G01C 19/5733
See application file for complete search history.

(56) References Cited

U.S. PATENT DOCUMENTS

| | | | |
|---|---|---|---|
| 4,511,848 A | 4/1985 | Watson | |
| 4,644,793 A | 2/1987 | Churh | |
| 4,736,629 A | 4/1988 | Cole | |
| 4,983,007 A | 1/1991 | James et al. | |
| 5,083,466 A | 1/1992 | Holm-Kennedy et al. | |

(Continued)

FOREIGN PATENT DOCUMENTS

| | | |
|---|---|---|
| DE | 102007054505 | 5/2009 |
| DE | 102008002748 | 12/2009 |

(Continued)

OTHER PUBLICATIONS

Civil Action No. 2:13-cv-405-JRG, "Invalidity Contentions", Oct. 31, 2013.

(Continued)

*Primary Examiner* — Laura Martin
*Assistant Examiner* — Samir M Shah
(74) *Attorney, Agent, or Firm* — Amin, Turocy & Watson, LLP (57) ABSTRACT

A system and method in accordance with an embodiment reduces the cross-axis sensitivity of a gyroscope. This is achieved by building a gyroscope using a mechanical transducer that comprises a spring system that is less sensitive to fabrication imperfection and optimized to minimize the response to the rotations other than the intended input rotation axis. The longitudinal axes of the first and second flexible elements are parallel to each other and parallel to the first direction.

10 Claims, 8 Drawing Sheets

(56) References Cited

U.S. PATENT DOCUMENTS

| | | | |
|---|---|---|---|
| 5,233,312 A | 8/1993 | Duft et al. | |
| 5,241,861 A * | 9/1993 | Hulsing, II | F02G 1/044 73/504.04 |
| 5,349,855 A | 9/1994 | Bernstein et al. | |
| 5,359,893 A | 11/1994 | Dunn | |
| 5,367,194 A | 11/1994 | Beatty | |
| 5,392,650 A * | 2/1995 | O'Brien | G01C 19/5719 73/514.18 |
| 5,481,914 A | 1/1996 | Ward | |
| 5,490,420 A | 2/1996 | Burdess | |
| 5,600,064 A * | 2/1997 | Ward | G01C 19/5719 73/504.03 |
| 5,635,638 A | 6/1997 | Geen | |
| 5,650,568 A * | 7/1997 | Greiff | B81B 3/0051 73/504.09 |
| 5,656,778 A | 8/1997 | Roszhart | |
| 5,659,195 A | 8/1997 | Kaiser et al. | |
| 5,703,292 A | 12/1997 | Ward | |
| 5,703,293 A | 12/1997 | Zabler et al. | |
| 5,728,936 A | 3/1998 | Lutz | |
| 5,767,405 A | 6/1998 | Bernstein et al. | |
| 5,780,740 A | 7/1998 | Lee et al. | |
| 5,895,850 A | 4/1999 | Buestgens | |
| 5,915,168 A | 6/1999 | Salatino et al. | |
| 5,955,668 A | 9/1999 | Hsu et al. | |
| 5,992,233 A * | 11/1999 | Clark | G01C 19/5719 361/280 |
| 5,996,409 A | 12/1999 | Funk et al. | |
| 6,032,531 A * | 3/2000 | Roszhart | G01C 19/56 73/504.04 |
| 6,036,872 A | 3/2000 | Wood et al. | |
| 6,067,858 A | 5/2000 | Clark et al. | |
| 6,079,271 A * | 6/2000 | Hulsing, II | F02G 1/044 73/504.04 |
| 6,098,462 A * | 8/2000 | Hulsing, II | F02G 1/044 73/504.04 |
| 6,122,961 A | 9/2000 | Geen et al. | |
| 6,134,961 A | 10/2000 | Touge et al. | |
| 6,153,917 A | 11/2000 | Matsunaga et al. | |
| 6,189,381 B1 | 2/2001 | Huang et al. | |
| 6,229,190 B1 | 5/2001 | Bryzek et al. | |
| 6,230,563 B1 | 5/2001 | Clark et al. | |
| 6,230,564 B1 | 5/2001 | Matsunaga et al. | |
| 6,250,156 B1 * | 6/2001 | Seshia | G01C 19/5719 73/504.12 |
| 6,250,157 B1 | 6/2001 | Touge | |
| 6,281,619 B1 | 8/2001 | Yanagisawa et al. | |
| 6,308,567 B1 | 10/2001 | Higuchi et al. | |
| 6,349,597 B1 | 2/2002 | Folkmer et al. | |
| 6,370,937 B2 | 4/2002 | Hsu | |
| 6,391,673 B1 | 5/2002 | Ha et al. | |
| 6,405,592 B1 | 6/2002 | Murari et al. | |
| 6,426,687 B1 | 7/2002 | Osborn | |
| 6,430,998 B2 | 8/2002 | Kawai et al. | |
| 6,433,411 B1 | 8/2002 | Degani et al. | |
| 6,445,195 B1 | 9/2002 | Ward | |
| 6,448,109 B1 | 9/2002 | Karpman | |
| 6,452,238 B1 | 9/2002 | Orcutt et al. | |
| 6,470,748 B1 | 10/2002 | Geen | |
| 6,479,320 B1 | 11/2002 | Gooch | |
| 6,480,320 B2 | 11/2002 | Nasiri | |
| 6,481,283 B1 | 11/2002 | Cardarelli | |
| 6,481,284 B2 | 11/2002 | Geen et al. | |
| 6,481,285 B1 | 11/2002 | Shkel et al. | |
| 6,487,908 B2 | 12/2002 | Geen et al. | |
| 6,490,391 B1 | 12/2002 | Zhao et al. | |
| 6,494,096 B2 | 12/2002 | Sakai et al. | |
| 6,508,122 B1 | 1/2003 | McCall et al. | |
| 6,508,125 B2 | 1/2003 | Otani | |
| 6,513,380 B2 | 2/2003 | Reeds, III et al. | |
| 6,519,075 B2 | 2/2003 | Carr et al. | |
| 6,520,017 B1 | 2/2003 | Schoefthaler et al. | |
| 6,528,344 B2 | 3/2003 | Kang | |
| 6,533,947 B2 | 3/2003 | Nasiri et al. | |
| 6,539,804 B1 | 4/2003 | Iwata | |
| 6,555,417 B2 | 4/2003 | Spooner et al. | |
| 6,559,530 B2 | 5/2003 | Hinzel et al. | |
| 6,571,035 B1 | 5/2003 | Pi et al. | |
| 6,571,630 B1 | 6/2003 | Weinberg et al. | |
| 6,598,476 B2 | 7/2003 | Terada et al. | |
| 6,621,137 B1 | 9/2003 | Ma et al. | |
| 6,621,952 B1 | 9/2003 | Pi et al. | |
| 6,625,349 B2 | 9/2003 | Zhao et al. | |
| 6,628,177 B2 | 9/2003 | Clark et al. | |
| 6,651,500 B2 | 11/2003 | Stewart et al. | |
| 6,660,564 B2 | 12/2003 | Brady | |
| 6,668,614 B2 | 12/2003 | Itakura | |
| 6,718,097 B2 | 4/2004 | Dyott | |
| 6,722,197 B2 | 4/2004 | Knowles et al. | |
| 6,742,390 B2 | 6/2004 | Mochida et al. | |
| 6,758,093 B2 | 7/2004 | Tang et al. | |
| 6,766,689 B2 | 7/2004 | Spinola Durante et al. | |
| 6,794,272 B2 | 9/2004 | Turner et al. | |
| 6,796,178 B2 | 9/2004 | Jeong et al. | |
| 6,823,733 B2 | 11/2004 | Ichinose | |
| 6,837,108 B2 * | 1/2005 | Platt | G01C 19/5719 324/115 |
| 6,845,669 B2 | 1/2005 | Acar et al. | |
| 6,846,690 B2 | 1/2005 | Farcy et al. | |
| 6,854,315 B2 | 2/2005 | Wyse | |
| 6,856,217 B1 | 2/2005 | Clark et al. | |
| 6,860,150 B2 | 3/2005 | Cho | |
| 6,860,151 B2 * | 3/2005 | Platt | G01C 19/5719 73/504.12 |
| 6,862,934 B2 * | 3/2005 | Weinberg | G01C 19/5719 73/504.02 |
| 6,877,374 B2 | 4/2005 | Geen | |
| 6,892,575 B2 | 5/2005 | Nasiri et al. | |
| 6,915,693 B2 | 7/2005 | Kim et al. | |
| 6,918,297 B2 | 7/2005 | MacGugan | |
| 6,918,298 B2 | 7/2005 | Park | |
| 6,938,484 B2 | 9/2005 | Najafi et al. | |
| 6,939,473 B2 | 9/2005 | Nasiri et al. | |
| 6,955,086 B2 | 10/2005 | Yoshikawa et al. | |
| 6,964,195 B2 * | 11/2005 | Hobbs | G01C 19/5719 73/504.12 |
| 6,981,416 B2 | 1/2006 | Chen et al. | |
| 7,004,025 B2 | 2/2006 | Tamura | |
| 7,028,547 B2 | 4/2006 | Shiratori et al. | |
| 7,036,372 B2 | 5/2006 | Chjnacki et al. | |
| 7,036,373 B2 * | 5/2006 | Johnson | G01C 19/5719 73/504.02 |
| 7,040,163 B2 | 5/2006 | Shcheglov et al. | |
| 7,051,590 B1 * | 5/2006 | Lemkin | G01C 19/5719 73/504.04 |
| 7,085,452 B1 | 8/2006 | Lin et al. | |
| 7,100,446 B1 | 9/2006 | Acar et al. | |
| 7,104,129 B2 | 9/2006 | Nasiri et al. | |
| 7,121,141 B2 | 10/2006 | McNeill | |
| 7,152,473 B1 | 12/2006 | Rushefsky et al. | |
| 7,155,976 B2 | 1/2007 | Kai-Cheng et al. | |
| 7,168,317 B2 | 1/2007 | Chen et al. | |
| 7,196,404 B2 | 3/2007 | Schirmer et al. | |
| 7,205,867 B2 | 4/2007 | Lutz et al. | |
| 7,210,347 B2 * | 5/2007 | Nicu | G01C 19/574 73/504.12 |
| 7,210,351 B2 | 5/2007 | Lo et al. | |
| 7,213,458 B2 * | 5/2007 | Weber | G01C 19/5719 73/504.12 |
| 7,227,432 B2 | 6/2007 | Lutz et al. | |
| 7,231,824 B2 * | 6/2007 | French | G01C 19/5719 73/504.12 |
| 7,247,246 B2 | 7/2007 | Nasiri et al. | |
| 7,250,112 B2 | 7/2007 | Nasiri et al. | |
| 7,284,429 B2 | 10/2007 | Chaumet et al. | |
| 7,284,430 B2 | 10/2007 | Acar et al. | |
| 7,290,435 B2 | 11/2007 | Seeger et al. | |
| 7,302,848 B2 * | 12/2007 | Kourepenis | G01C 19/5719 73/504.16 |
| 7,323,952 B2 | 1/2008 | Pan et al. | |
| 7,335,971 B2 | 2/2008 | Funk | |
| 7,363,814 B2 | 4/2008 | Okada | |

(56) References Cited

U.S. PATENT DOCUMENTS

| | | | |
|---|---|---|---|
| 7,377,167 B2 | 5/2008 | Acar et al. | |
| 7,394,245 B2 | 7/2008 | Brunson et al. | |
| 7,406,220 B1 | 7/2008 | Christensen et al. | |
| 7,430,909 B2 | 10/2008 | Adams et al. | |
| 7,437,933 B2 | 10/2008 | Durante et al. | |
| 7,444,868 B2 * | 11/2008 | Johnson | G01C 19/5719 73/504.12 |
| 7,444,870 B2 | 11/2008 | Uchiyama et al. | |
| 7,454,246 B2 | 11/2008 | Merfeld | |
| 7,454,971 B2 | 11/2008 | Blomqvist | |
| 7,458,263 B2 | 12/2008 | Nasiri et al. | |
| 7,461,552 B2 | 12/2008 | Acar | |
| 7,478,557 B2 | 1/2009 | Geen | |
| 7,484,410 B2 | 2/2009 | Tsuji et al. | |
| 7,486,855 B2 | 2/2009 | Smith et al. | |
| 7,512,298 B2 | 3/2009 | Yi et al. | |
| 7,513,155 B2 | 4/2009 | Jeong et al. | |
| 7,520,169 B2 | 4/2009 | Schwarzelbach | |
| 7,526,957 B2 | 5/2009 | Watson | |
| 7,543,496 B2 | 6/2009 | Ayazi et al. | |
| 7,546,768 B2 * | 6/2009 | Mase | G01C 19/5719 73/493 |
| 7,617,728 B2 | 11/2009 | Cardarelli | |
| 7,621,183 B2 * | 11/2009 | Seeger | G01C 19/5712 73/504.04 |
| 7,677,099 B2 * | 3/2010 | Nasiri | G01C 19/5719 73/504.04 |
| 7,694,563 B2 | 4/2010 | Durante et al. | |
| 7,702,202 B2 | 4/2010 | Koch et al. | |
| 7,832,271 B2 | 11/2010 | Mita et al. | |
| 7,840,102 B2 | 11/2010 | Boyd | |
| 7,903,240 B2 | 3/2011 | Smith et al. | |
| 7,903,906 B2 | 3/2011 | Smith et al. | |
| 7,933,022 B2 | 4/2011 | Smith et al. | |
| 7,934,423 B2 | 5/2011 | Nasiri et al. | |
| 8,020,441 B2 * | 9/2011 | Seeger | G01C 19/5719 73/504.04 |
| 8,042,393 B2 | 10/2011 | Gier et al. | |
| 8,042,396 B2 | 10/2011 | Coronato et al. | |
| 8,069,726 B2 * | 12/2011 | Seeger | G01C 19/5712 73/504.04 |
| 8,087,295 B2 | 1/2012 | Netzer | |
| 8,096,181 B2 | 1/2012 | Fukmoto | |
| 8,113,050 B2 * | 2/2012 | Acar | G01C 19/574 73/504.04 |
| 8,117,913 B2 | 2/2012 | Terada | |
| 8,124,927 B2 | 2/2012 | Savchenkov et al. | |
| 8,141,424 B2 * | 3/2012 | Seeger | G01C 19/5719 73/504.12 |
| 8,171,792 B2 | 5/2012 | Sameshima | |
| 8,176,779 B2 | 5/2012 | Blomqvist | |
| 8,205,498 B2 * | 6/2012 | Hsu | G01P 15/125 73/514.32 |
| 8,230,740 B2 | 7/2012 | Katsuki et al. | |
| 8,250,921 B2 * | 8/2012 | Nasiri | G01P 1/023 73/493 |
| 8,256,290 B2 | 9/2012 | Mao | |
| 8,272,267 B2 | 9/2012 | Tamura et al. | |
| 8,312,769 B2 | 11/2012 | Coronato et al. | |
| 8,322,213 B2 | 12/2012 | Trusov et al. | |
| 8,342,023 B2 | 1/2013 | Geiger | |
| 8,342,025 B2 * | 1/2013 | Coronato | G01C 19/5712 73/504.14 |
| 8,347,716 B2 * | 1/2013 | Cazzaniga | G01C 19/5712 73/504.12 |
| 8,347,717 B2 * | 1/2013 | Seeger | G01C 19/5719 73/504.12 |
| 8,375,789 B2 | 2/2013 | Prandi et al. | |
| 8,413,506 B2 | 4/2013 | Coronato et al. | |
| 8,429,970 B2 | 4/2013 | Rocchi | |
| 8,459,109 B2 * | 6/2013 | Caminada | G01C 19/5712 73/504.12 |
| 8,479,575 B2 | 7/2013 | Kempe | |
| 8,534,127 B2 | 9/2013 | Seeger et al. | |
| 8,833,162 B2 * | 9/2014 | Seeger | G01C 19/5712 73/504.12 |
| 8,899,112 B2 * | 12/2014 | Furuhata | G01C 19/5719 73/504.12 |
| 9,010,184 B2 * | 4/2015 | Zou | G01P 15/125 73/504.12 |
| 9,012,830 B2 | 4/2015 | Zhu et al. | |
| 9,052,194 B2 | 6/2015 | Seeger et al. | |
| 9,052,196 B2 * | 6/2015 | Geiger | G01C 19/5755 |
| 9,170,107 B2 * | 10/2015 | Anac | G01C 19/574 |
| RE45,792 E * | 11/2015 | Coronato | G01C 19/5712 |
| 2002/0044721 A1 | 4/2002 | Bjorklund | |
| 2002/0051258 A1 | 5/2002 | Tamura | |
| 2002/0094168 A1 | 7/2002 | Cai et al. | |
| 2002/0183899 A1 | 12/2002 | Wallner | |
| 2002/0189351 A1 | 12/2002 | Reeds et al. | |
| 2002/0189352 A1 | 12/2002 | Reeds, III et al. | |
| 2002/0189353 A1 | 12/2002 | Knowles et al. | |
| 2003/0074967 A1 | 4/2003 | Tang et al. | |
| 2003/0110858 A1 | 6/2003 | Kim et al. | |
| 2003/0164040 A1 | 9/2003 | Willig et al. | |
| 2003/0164041 A1 | 9/2003 | Jeong et al. | |
| 2004/0055380 A1 | 3/2004 | Shcheglov et al. | |
| 2004/0058476 A1 | 3/2004 | Enquist et al. | |
| 2004/0211257 A1 | 10/2004 | Geen | |
| 2004/0211258 A1 | 10/2004 | Geen | |
| 2004/0223697 A1 | 11/2004 | Andersen et al. | |
| 2005/0050954 A1 | 3/2005 | Chaumet et al. | |
| 2005/0066728 A1 | 3/2005 | Chojnacki et al. | |
| 2005/0072231 A1 | 4/2005 | Chojnacki et al. | |
| 2005/0081633 A1 * | 4/2005 | Nasiri | G01C 19/5712 73/514.29 |
| 2005/0170656 A1 | 8/2005 | Nasiri et al. | |
| 2005/0199061 A1 | 9/2005 | Acar et al. | |
| 2005/0229703 A1 | 10/2005 | Geen et al. | |
| 2005/0229706 A1 * | 10/2005 | Vandemeer | B81B 3/001 73/514.38 |
| 2006/0032310 A1 | 2/2006 | Merassi et al. | |
| 2006/0070441 A1 | 4/2006 | Durante et al. | |
| 2006/0112764 A1 | 6/2006 | Higuchi | |
| 2006/0133728 A1 | 6/2006 | Biyikli et al. | |
| 2006/0156814 A1 * | 7/2006 | Blomqvist | G01C 19/5712 73/504.12 |
| 2006/0272411 A1 | 12/2006 | Acar et al. | |
| 2007/0034007 A1 * | 2/2007 | Acar | G01P 15/0888 73/514.01 |
| 2007/0062282 A1 | 3/2007 | Akashi et al. | |
| 2007/0119252 A1 * | 5/2007 | Adams | G01P 15/0802 73/510 |
| 2007/0131030 A1 | 6/2007 | Jeong et al. | |
| 2007/0180909 A1 | 8/2007 | Uchiyama et al. | |
| 2007/0194857 A1 | 8/2007 | Schwarzelbach | |
| 2007/0214883 A1 | 9/2007 | Durante et al. | |
| 2007/0220971 A1 | 9/2007 | Ayazi et al. | |
| 2007/0240508 A1 | 10/2007 | Watson | |
| 2007/0289382 A1 | 12/2007 | Caminada et al. | |
| 2008/0115562 A1 | 5/2008 | Haino et al. | |
| 2008/0115579 A1 | 5/2008 | Seeger et al. | |
| 2008/0190200 A1 | 8/2008 | Caminada et al. | |
| 2008/0276706 A1 | 11/2008 | Hartmann et al. | |
| 2009/0064780 A1 | 3/2009 | Coronato et al. | |
| 2009/0090200 A1 | 4/2009 | Mita et al. | |
| 2009/0100930 A1 | 4/2009 | Coronato et al. | |
| 2009/0260437 A1 * | 10/2009 | Blomqvist | G01C 19/5712 73/504.12 |
| 2009/0308201 A1 | 12/2009 | Romano | |
| 2010/0011857 A1 | 1/2010 | Gier et al. | |
| 2010/0071467 A1 * | 3/2010 | Nasiri | G01C 19/5719 73/504.12 |
| 2010/0097682 A1 | 4/2010 | Angeley et al. | |
| 2010/0116050 A1 | 5/2010 | Wolfram | |
| 2010/0126269 A1 | 5/2010 | Coronato et al. | |
| 2010/0126272 A1 | 5/2010 | Coronato et al. | |
| 2010/0132463 A1 | 6/2010 | Caminada et al. | |
| 2010/0154541 A1 | 6/2010 | Cazzaniga et al. | |
| 2010/0186507 A1 | 7/2010 | Gunthner et al. | |
| 2010/0257934 A1 | 10/2010 | Zhang et al. | |
| 2010/0263446 A1 | 10/2010 | Tamura et al. | |

(56) References Cited

U.S. PATENT DOCUMENTS

| | | | |
|---|---|---|---|
| 2010/0281977 | A1 | 11/2010 | Coronato et al. |
| 2011/0030473 | A1 | 2/2011 | Acar |
| 2011/0061460 | A1 | 3/2011 | Seeger et al. |
| 2011/0094301 | A1* | 4/2011 | Rocchi ............... G01C 19/574 |
| | | | 73/504.08 |
| 2011/0154898 | A1 | 6/2011 | Cazzaniga et al. |
| 2011/0303007 | A1 | 12/2011 | Rocchi |
| 2012/0024056 | A1 | 2/2012 | Hammer |
| 2012/0048017 | A1 | 3/2012 | Kempe |
| 2012/0055248 | A1 | 3/2012 | Hammer |
| 2012/0060604 | A1 | 3/2012 | Neul et al. |
| 2016/0320180 | A1 | 11/2016 | Lodden et al. |
| 2016/0334440 | A1 | 11/2016 | Fertig et al. |
| 2016/0349283 | A1 | 12/2016 | Bramhavar et al. |

FOREIGN PATENT DOCUMENTS

| | | |
|---|---|---|
| DE | 102009001248 | 9/2010 |
| DE | 102009001922 | 9/2010 |
| DE | 102010028005 | 10/2011 |
| EP | 1619471 | 1/2006 |
| EP | 1624286 | 2/2006 |
| EP | 1832841 | 9/2007 |
| EP | 2211458 | 7/2010 |
| JP | H8-94654 | 4/1996 |
| JP | 2001304867 | 10/2001 |
| JP | 2004163376 | 6/2004 |
| JP | 2005241500 | 9/2005 |
| JP | 2007071677 | 3/2007 |
| JP | 2007155489 | 6/2007 |
| JP | 2008514968 | 5/2008 |
| JP | 2010261740 | 11/2010 |
| WO | 0120259 | 3/2001 |
| WO | 2004097431 | 11/2004 |
| WO | 2007086849 | 8/2007 |
| WO | 2007145113 | 12/2007 |
| WO | 2009033915 | 3/2009 |
| WO | 2009087858 | 7/2009 |

OTHER PUBLICATIONS

Civil Action No. 2:13-cv-405-JRG, Exhibit A, Invalidity Charts for U.S. Pat. No. 8,347,717, Oct. 31, 2013.
Civil Action No. 2:13-cv-405-JRG, Exhibit C, Motivation to Combine References, Oct. 31, 2013.
Civil Action No. 2:13-cv-405-JRG, Exhibit B, Table of References, Oct. 31, 2013.
Civil Action No. 2:13-cv-405-JRG, Exhibit D, Invalidity Charts for U.S. Pat. No. 8,351,773, Oct. 31, 2013.
Civil Action No. 2:13-cv-405-JRG, Exhibit F, Motivation to Combine References, Oct. 31, 2013.
Civil Action No. 2:13-cv-405-JRG, Exhibit E, Table of References, Oct. 31, 2013.
Civil Action No. 2:13-cv-405-JRG, Exhibit G, Invalidity Charts for U.S. Pat. No. 8,250,921, Oct. 31, 2013.
Civil Action No. 2:13-cv-405-JRG, Exhibit I, Motivation to Combine References, Oct. 31, 2013.
Civit Action No. 2:13-cv-405-JRG, Exhibit H, Table of References, Oct. 31, 2013.
Wood, et al., "A Monolithic Silicon Gyroscope Capable of Sensing About Three-Axes Simultaneously," 1996, The Institution of Electrical Engineers, IEEE, London.
Geiger, et al., "New Designs of Micromachined Vibrating Rate Gyroscopes with Decoupled Oscilation Modes," Jun. 19, 1997, International Conference on Solid-State and Actuators, IEEE, Chicago.
Lutz, "A Precision Yaw Rate Sensor in Silicon Micromachining," Jun. 19, 1997, International Conference on Solid-State Sensors and Actuators, IEEE, Chicago.
Yazdi, et al., "Micormachind inertial Sensor," Apr. 29, 1998, IEEE, vol. 86, No. 8.
Anderson, et al., "A Novel Silicon Bulk Gyroscope," 1999, The IMEGO Institute, Sweden.
Butefisch, et al., "Three-Axes Monolithic Silicon Low-g Accelerometer," Dec. 2000, Journal of Microelectromechanical Systems, vol. 9, No. 4, IEEE.
Brandl etal., "High Performance Accelerometer Based on CMOS Technologies with Low Cost Add-Ons", 2001, IEEE.
Brandl et al., "A Modular MEMS Accelerometer Concept," 2003, AustriaMicroSystems.
Acar et al., "An Approach for Increasing Drive-Mode Bandwidth of MEMS Vibratory Gyroscopes," Jun. 2005, Journal of Microelectromechanical Systems, vol. 14, No. 3, IEEE.
Schofield, et al., "Multi-Degree of Freedom Tuning Fork Gyroscope Demonstrating Shock Rejection," 2007, IEEE Sensors Conference.
Tsai et al., "Design and Dynamics of an Innovative Micro Gyroscope Against Coupling Effects", 2008, Dept. of Mechanical Engineering, National Cheng Kung University, Taiwan.
Tsai et al., "Design and Analysis of a Tri-Axis Gyroscope Micromachined by Surface Fabrication," Nov. 12, 2008, IEEE Sensors Journal, vol. 8, No. 12.
Prandi et al., "A Low-Power 3-Axis Digital-Output MEMS Gyroscope with Single Drive and Multiplexed Angular Rate Readout," Feb. 21, 2011, IEEE International Solid-State Circuits Conference.
PCT, Notification of Transmittal of the International Search Report and the Written Opinion of the International Searching Authority, or the Declaration, Feb. 7, 2008.
Office Action for U.S. Appl. No. 13/361,261 dated Dec. 18, 2014, 73 pages.
Yazdi, et al., "Micromachined Inertial Sensors", Proceedings of the IEEE, Aug. 1998, pp. 1640-1659, vol. 86, No. 8.
Office Action dated Oct. 10, 2012 for U.S. Appl. No. 12/558,398, 13 pages.
Office Action dated Sep. 14, 2012 for U.S. Appl. No. 13/564,615, 13 pages.
Office Action dated Dec. 18, 2014 for U.S. Appl. No. 13/361,261, 73 pages.
Notice of Allowance dated Feb. 1, 2017 for U.S. Appl. No. 14/698,451, 128 pages.

* cited by examiner

Figure 1

Prior Art

Figure 2A  Figure 2B

Prior Art

Prior Art

ID IMPROVED SPRING SYSTEM

MEMS DEVICE WITH IMPROVED SPRING SYSTEM

CROSS-REFERENCE TO RELATED APPLICATION

Under 35 U.S.C. 120, this application is a Divisional Application and claims priority to U.S. patent application Ser. No. 13/361,261 (now U.S. Pat. No. 9,097,524), filed on Jan. 30, 2012, entitled "MEMS DEVICE WITH IMPROVED SPRING SYSTEM," which claims priority to U.S. provisional application Ser. No. 61/553,031 filed on Oct. 28, 2011, entitled "MEMS GYROSCOPE WITH IMPROVED SPRING SYSTEM," and is a Continuation-in-Part of application Ser. No. 12/558,398 (now U.S. Pat. No. 8,534,127), filed on Sep. 11, 2009 and entitled "EXTENSION-MODE ANGUALR VELOCITY SENSOR," all of which are incorporated herein by reference in their entireties.

FIELD OF THE INVENTION

The present invention relates generally to MEMS devices and more particularly to springs utilized in such devices.

BACKGROUND OF THE INVENTION

A gyroscope is a sensor that measures angular velocity about a sensitive axis. An ideal yaw gyroscope is sensitive to angular velocity about the Z-axis, which is normal to a plane of the sensor. Ideal pitch and roll gyroscopes are sensitive to angular velocities about the X-axis and the Y-axis which are orthogonal in the plane of the sensor. Ideally, all three gyroscope sensitive axes are mutually orthogonal.

Fabrication imperfections can cause the sensitive axis to deviate from the ideal input axis. For example a yaw gyroscope, which responds to angular velocity about the Z-axis, can also respond to angular velocity about the X-axis and/or the Y-axis.

Cross-axis sensitivity is a measure of the gyroscope sensitivity to angular velocity about an axis orthogonal to the intended input axes. Cross-axis sensitivity causes errors in a system using a gyroscope because the gyroscope responds to angular velocity about an axis other than the intended axis. For example, if the yaw gyroscope has cross-axis sensitivity, it would be responsive to the angular velocity around the X-axis and/or the Y-axis. Hence, the output of the yaw gyroscope would show a response as if there is a Z axis angular velocity although the actual angular velocity is around the X-axis and/or the Y-axis. Correcting the errors caused by cross-axis sensitivity requires calibration of each gyroscope, which is costly.

MEMS gyroscopes are typically fabricated from silicon. The silicon layer is etched using deep reactive ion etching (DRIE). The gyroscopes are formed using batch fabrication, which means several thousand gyroscopes are formed in the single etch step. Gyroscopes using conventional springs are more responsive to the cross-axis sensitivity because conventional springs couple in-plane motion to out-of-plane motion due to fabrication errors. The challenge is to produce a high accuracy gyroscope with high yield and small size to maintain low cost. The present invention addresses such a need.

SUMMARY OF THE INVENTION

A system and method in accordance with an embodiment reduces the cross-axis sensitivity of a MEMS force sensor such as a gyroscope. This is achieved by building a gyroscope using a mechanical transducer that comprises a spring system that is less sensitive to fabrication imperfection and optimized to minimize the response to the rotations other than the intended input rotation axis. A key feature of the present invention is a spring system that is less sensitive to the fabrication imperfections caused by the non-idealities in the deep reactive etching process which is used to manufacture high aspect ratio micro gyroscopes and other force sensors.

The spring system minimizes coupling of the in-plane motion to out-of plane motion, which is due to the non-ideal (non vertical) cross section of the springs caused by fabrication imperfections. In-plane to out-of plane coupling is the main cause of cross axis sensitivity, in which a gyroscope for example responds to angular velocity about axes other than the intended sensitive axis.

Gyroscopes using conventional springs are more responsive to the cross-axis sensitivity because conventional springs couple in-plane motion to out-of-plane motion due to fabrication errors.

DETAILED DESCRIPTION

The present invention relates generally to MEMS devices and more particularly to springs utilized in such devices. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Figure 1:
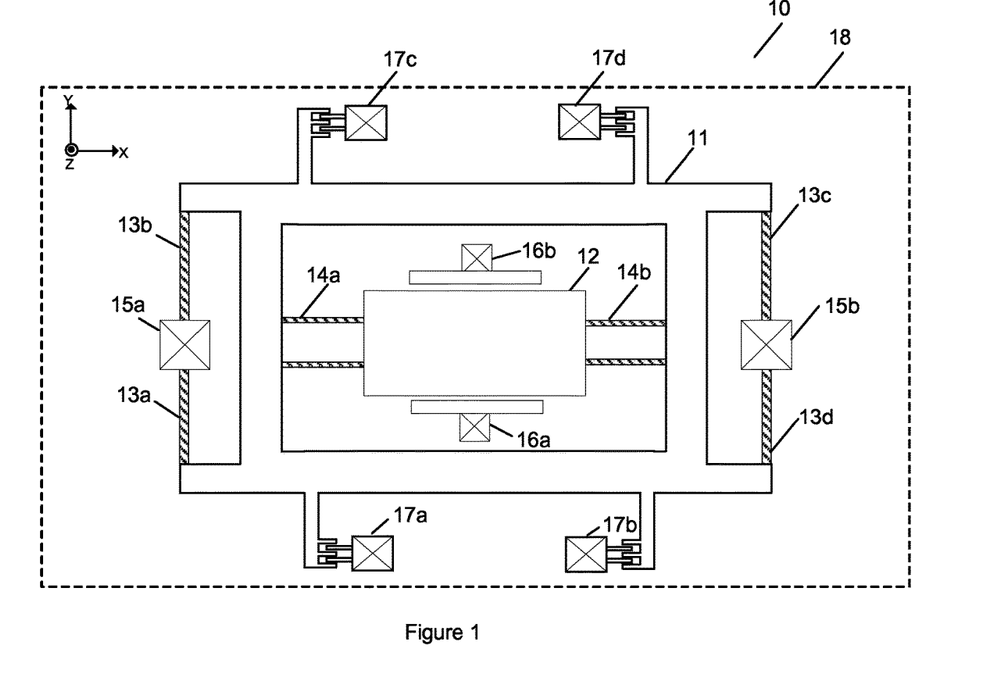
FIG. 1 illustrates an embodiment of a conventional micro machined yaw gyroscope.

FIG. 1 illustrates an embodiment of a conventional micro machined yaw gyroscope 10. The yaw gyroscope 10 is comprised of a drive frame 11, a proof mass 12, drive springs 13a-13d, sense springs 14a and 14b, anchors 15a and 15b, transducers 16a and 16b, and electrostatic drive combs 17a-17d. The yaw gyroscope 10 is suspended over and parallel to a substrate 18. The drive frame 11 is supported by the drive springs 13a-13d each of which extends from the support anchors 15a and 15b attached to the substrate 18. The gyroscope 10 includes a proof mass 12 which is attached to the drive frame 11 by the sense springs 14a and 14b.

The drive frame 11 and the proof mass 12 are driven into oscillation in an X-direction in a plane by the drive comb structures 17a-d which are coupled to a alternating voltage source (not shown) and generate alternating electrostatic forces in the plane. The proof mass 12 is typically oscillated at a frequency of between 10 kHz to 40 kHz. In an embodiment, the frequency is greater than 20 kHz. Rotating the yaw gyroscope 10 with an angular velocity can impart a Coriolis force to the oscillating proof mass 12. The Coriolis force is proportional to the angular velocity and depends on the orientation of the axis of the angular velocity with respect to the oscillation direction of the proof mass. The Coriolis force, the angular velocity, and the oscillation direction of the proof mass are mutually orthogonal.

In the yaw gyroscope 10, angular velocity about the Z-axis imparts a Coriolis force in the Y-direction on the proof mass 12 oscillating in the X-direction. The Coriolis force in the Y-direction imparted to the proof mass 12 is sensed by measuring the motion of the proof mass 12 in the Y-direction by the use of the transducers 16a and 16b. The transducers 16a and 16b may be electrodes that form capacitances to the proof-mass 12, wherein the capacitances change as a result of the proof-mass motion.

In the yaw gyroscope 10, angular velocity about the Y-axis imparts a Coriolis force in the Z-direction on the proof mass 12 oscillating in the X-direction. In an ideal yaw gyroscope 10, the motion generated by the Coriolis force in the Z-direction imparted on the proof mass 12 is usually insignificant compared to the motion generated by the Coriolis force in the Y-direction because the out-of-plane stiffness of the sense springs is usually much bigger than the in-plane stiffness of the sense springs 14a and 14b. The difference between the in-plane and out-of plane stiffness is achieved by increasing the thickness (H) to width (W) ratio (aspect ratio) of the sense springs 14a and 14b. In other words, the springs 14a and 14b etched with high aspect ratio can provide the needed difference between the in-plane and out-of plane stiffness to minimize the motion of the proof mass 12 in the Z direction.

In bulk micromachining, high aspect ratio structures can be generated with the use of deep reactive etching process (DRIE). DRIE can provide a thickness to width ratio greater than 20:1 for single crystal silicon structures. However, although DRIE is a good process to manufacture high aspect ratio structures, it includes some non-idealities. One of the most important drawbacks of the DRIE is the non-vertical or tilted cross sections generated during the etching process. The tilt angle of the sidewall of the cross section is generally called the showerhead angle. Non-vertical cross sections occur due to the non-uniform distribution of the etchants among the wafer during the DRIE process.

Figure 2A:
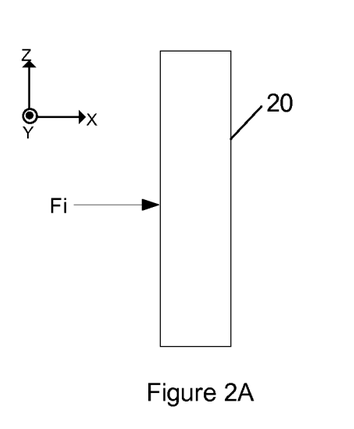
FIG. 2A illustrates the cross-section of a cantilever beam with an ideal cross-section.
Figure 2B:
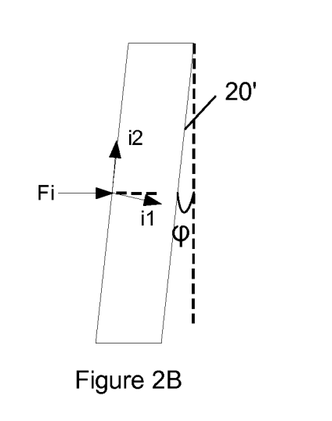
FIG. 2B illustrates the cross-section of a cantilever beam with a non-ideal or non-vertical cross-section.

The effect of the showerhead angle on the flexure elements in the microstructures can be explained by cantilever beams. FIG. 2A illustrates the cross-section of a cantilever beam with an ideal cross-section 20. FIG. 2B illustrates the cross-section of a cantilever beam 20' with a non-ideal or non-vertical cross-section.

If a force is applied in a direction to the cantilever beam 20 with the ideal cross section, the beam 20 purely deflects in the direction of the force. However, due to the non-idealities of the micro machining process the cross section of the cantilever beam 20' can be non-vertical as shown in FIG. 2B.

A cantilever beam 20 with non-ideal cross section has different characteristics than the beam with the ideal cross section. If a force (Fi) is applied to the cantilever beam 20, as shown in FIG. 2A, the beam 20 will deflect purely in the X direction. However, if a force applied to the non-ideal beam 20', as shown in FIG. 2B, the beam will tend to deflect in the i1 direction because the compliant axis of the beam 20' is not parallel to the X-Y plane. In response to a force in the X-direction, the deflection of the beam 20' will be both in the X-direction and the Z-direction. Similarly if a force is applied in the Z-direction to the beam 20', the beam 20' will deflect both in X- and Z-directions.

Figure 3A:
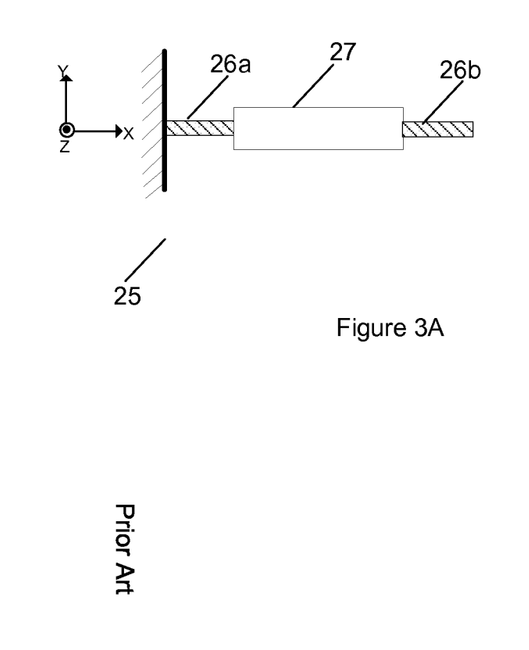
FIGS. 3A and 3B illustrate a common spring system.
Figure 3B:
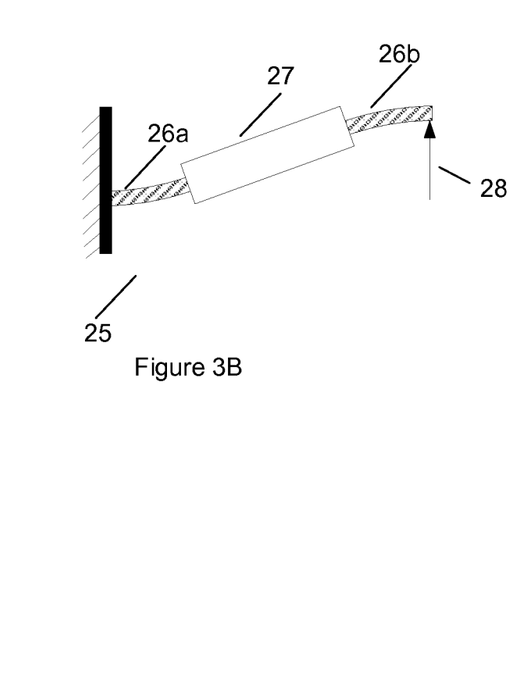

In micro mechanisms various types of beams or spring systems have been used to provide compliance to the mass that they are attached. One of the common spring systems that have been used in the microstructures is shown in FIG. 3A. The spring system 25 that is shown in FIG. 3A is comprised of two flexible elements 26a and 26b and one rigid element 27. In this spring system 25, the deflection of the flexible elements 26a and 26b is minimized by the added rigid element. When a force 28 is applied to the spring system 25, the flexible elements 26a and 26b deflect and the rigid element rotates around the Z-axis as shown in FIG. 3B. This type of spring system 25 ideally deflects in the direction of the force applied as the cantilever beams given previously. However, due to the non-idealities in the etching process the cross section of the flexible elements 26a and 26b of the spring system 25 can be non-vertical as shown in FIG. 2B. Hence, the displacement of the spring system 25 will also deviate from the ideal condition. For example, if an in-plane force is applied, in the Y-direction, to this spring system 25 with non-ideal flexible element cross section, the resulting deflection of the spring system 25 will be both in the Y-direction and the Z-direction.

Microstructures are generally built to be used as sensors like accelerometers, gyroscopes, compass etc. The basic principle behind the microstructures is usually based on sensing the externally applied forces. In such microstructures, externally applied force is converted to deflection and the deflection is sensed by various types of transducers. Consequently, ideal force input to deflection output is crucial in order to build a sensor with good performance. In other words, it is desired to have a resulting deflection solely in the direction of the force applied. If the externally applied force generates a deflection in the unintended direction of sensing, the sensor can have a degraded response, can give erroneous results, or can have cross-axis sensitivity.

Specifically, deviation of the intended motion direction from the applied force direction may cause problems in the conventional gyroscopes. One of the main problems is named as cross-axis sensitivity. Cross-axis sensitivity is a measure of the undesired response of a sensor other than the intended axis of measurement for angular velocity sensors and accelerometers. It is the erroneous measurement of the sensor as a result of the imperfections of the sensing transducer.

An ideal micromachined gyroscope, which does not have any cross-axis sensitivity, will only respond to the intended input rotation axis. If a micromachined gyroscope does not accurately reflect the intended input rotation axis, measurements of the gyroscope will be erroneous.

If the non-idealities like non-vertical cross-section, shown in FIG. 2A, is present on the drive springs 13a-13d or the sense springs 14a and 14b of a conventional yaw gyroscope 10, shown in FIG. 1, the drive frame 11 or proof-mass 12 will move both in the intended direction and partially in an unintended direction. There will be two different effects on the operation of the gyroscope depending on which of the springs have a non-vertical cross-section.

If the drive springs 13a-13d have a non-vertical cross section, they will tend to deflect both in X-direction and Z-direction during the motion of the drive frame 11 which is actuated by the comb structures 17a-17d. The effect of the non-vertical cross-section is that the proof-mass 12 oscillates both in the X-direction and partially in the Z-direction instead of oscillating only in the X-direction as with the ideal cross-section of the drive springs 13 *a-d*.

When the proof mass 12 oscillates in the X-direction, angular velocity about the Z-axis, causes a Coriolis force in the Y-direction. The Coriolis force in the Y-direction causes the proof-mass 12 to move in the Y-direction which is measured by the transducers 16a and 16b. However, the proof mass 12 oscillates not only in X-direction but also in the Z-direction due to the non-vertical cross-section of the drive springs 13a-d. Thus, angular velocity about the X-axis will also cause a Coriolis force in the Y-direction. Hence, the proof-mass 12 will move in the Y-direction in response to angular velocity about the Z-axis and the X-axis, causing the yaw gyroscope 10 to have cross-axis sensitivity.

If the sense springs 14a and 14b have a non-vertical cross section, they will tend to deflect both in the Y-direction and the Z-direction due to a Coriolis force acting on the proof-mass 12.

When the proof mass 12 oscillates in the X-direction, angular velocity about the Y-axis, causes a Coriolis force in the Z-direction. In the ideal case, the Coriolis force in the Z-direction causes the proof-mass 12 to move only in the Z-direction but not in the Y-direction, so the transducers 16a and 16b do not respond to angular velocity about the Y-axis. However, due to non-vertical cross-section of the sense springs 14a and 14b, the Z-directed Coriolis force causes the proof-mass 12 to move both in the Z-direction and the Y-direction. The proof-mass 12 motion in the Y-direction will be detected by the transducers 16a and 16b. Hence the yaw gyroscope 10 will have cross-axis sensitivity because it responds to angular velocity about the Z-axis and the Y-axis.

Pitch gyroscopes and roll gyroscopes sense angular velocity about an axes in the plane of the gyroscope. Pitch or roll gyroscopes may comprise a proof-mass oscillating in the plane and a transducer that senses out-of-plane motion of the proof-mass resulting from Coriolis forces in the Z-direction. Similar to yaw gyroscopes, non-vertical cross-section may also cause cross-axis sensitivity in pitch or roll gyroscopes due to the coupling of in-plane to out-of plane motion.

The forces applied to the cantilever beam 20 of FIG. 2, the spring system 25 in FIG. 3A, and to the drive springs 13a-13d and sense springs 14a and 14b of the conventional gyroscope 10 are transverse to the longitudinal axis of the flexible elements. Since the force applied is transverse to the longitudinal-axis, the deflections of the flexible elements are due to bending. If the flexible element has a non-vertical cross-section, the bending will cause deflections not only in the direction of the force applied but also in a direction orthogonal to the intended axis of motion which causes undesired motion of the structures coupled to the spring system.

Figure 4A:
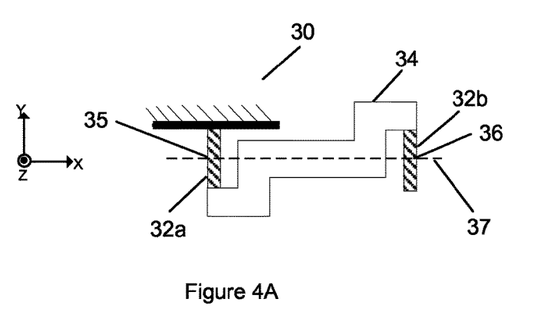
FIGS. 4A and 4B illustrate a spring system in accordance with an embodiment.

FIG. 4A illustrates a spring system 30 in accordance with an embodiment. The spring system 30 comprises a first flexible element 32a coupled to a rigid element 34. The rigid element 34 in turn is coupled to a second flexible 32b element. The first flexible element 32a is anchored, but in other embodiments may be connected to other mechanical structures. The longitudinal axes of the first and second flexible elements 32a and 32b are parallel to each other and parallel to the intended direction of motion. The midpoint 35 of the first flexible element and the midpoint 36 of the second flexible element are aligned along the axis 37 perpendicular to the intended direction of displacement. When a force 38 acts along the axial direction, or longitudinal-axis, of the flexible elements 32a and 32b, spring system deflects in the intended direction of displacement The force 38 causes both flexible elements 32a and 32b to bend in the plane and the rigid element 34 acts as a lever arm to increase the deflection as shown in FIG. 4B.

Figure 4B:
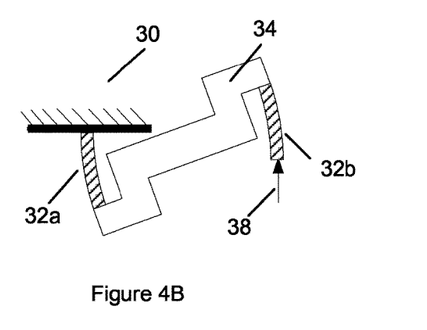

If a force is applied to the spring system 30, the flexible elements 32a and 32b will bend in-plane and the spring system 30 will deflect in the Y-direction as shown in FIG. 4B. If the flexible elements 32a and 32b have a non-vertical cross-section, the flexible elements 32a and 32b will bend in-plane and bend out-of-plane. The out-of-plane bending will cause the rigid element 34 to rotate about the X-axis. If both flexible elements 32a and 32b have the same cross-section, for example due to the both elements 32a and 32b having the same angle of the etching, the Z-axis displacement at the end of the spring system 30 is significantly reduced compared to the conventional spring systems with non-vertical cross-sections. The out-of-plane displacement is approximately proportional to the distance between the midpoint of the flexible elements 32a and 32b in the Y-direction. Thus the spring system 30 deflects in the direction of the in-plane force with substantially no deflection out-of-plane, which can be used to reduce cross-axis sensitivity.

Figure 5:
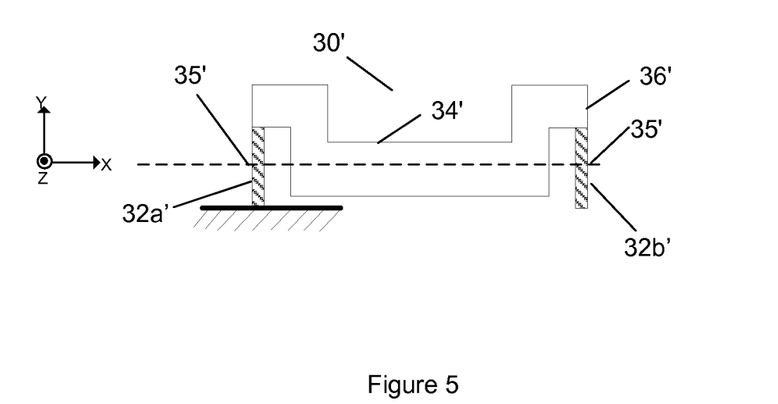
FIG. 5 illustrates a second embodiment of a spring system.
Figure 6:
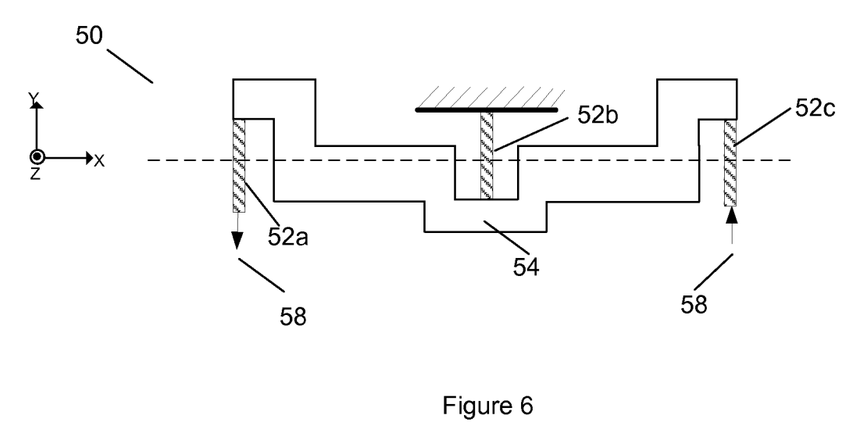
FIG. 6 illustrates a third embodiment of the spring system.

Two alternate embodiments of the low cross-axis spring system are shown in FIG. 5 and FIG. 6. FIG. 5 illustrates a second embodiment of the spring system. This embodiment has all the same features of the first embodiment, but the shape of the rigid element 34' is different and the flexible elements 32a' and 32b' connect to the same side of the rigid element. This embodiment operates in a similar manner to the first embodiment and similarly minimizes cross-axis coupling.

FIG. 6 illustrates a third embodiment of a spring system 50. The spring system 50 comprises first, second, and third flexible elements 52a-52c coupled to a rigid element 54. The second flexible element 52b is anchored, but in other embodiments may also be connected to other mechanical structures. Similar to the first embodiment, the longitudinal axes of the first, second and third flexible elements 52a-52c are parallel to each other and parallel to the intended direction of motion. The midpoints of all three flexible elements 52a-52c should be substantially aligned along an axis perpendicular to the direction of motion 58. Opposing forces are applied along the axial direction, or longitudinal-axis, of the first and third flexible elements 52a and 52c. The forces cause all flexible elements to bend in the plane. The rigid element 54 causes the endpoints of the first and third flexible elements 52a and 52c to move in opposite directions. This spring system 50 provides for two points to move in opposite directions with low cross-axis coupling.

The spring systems introduced in FIGS. 4A, 4B, 5 and 6 are advantageous in sensors, such as accelerometers, gyroscopes, magnetometers, force sensors, etc., that comprise a mechanical element that moves in response to a force and a transducer for measuring the deflection of the mechanical element. The cross-axis sensitivity of such sensors is reduced by using the low-cross axis spring system.

Figure 7:
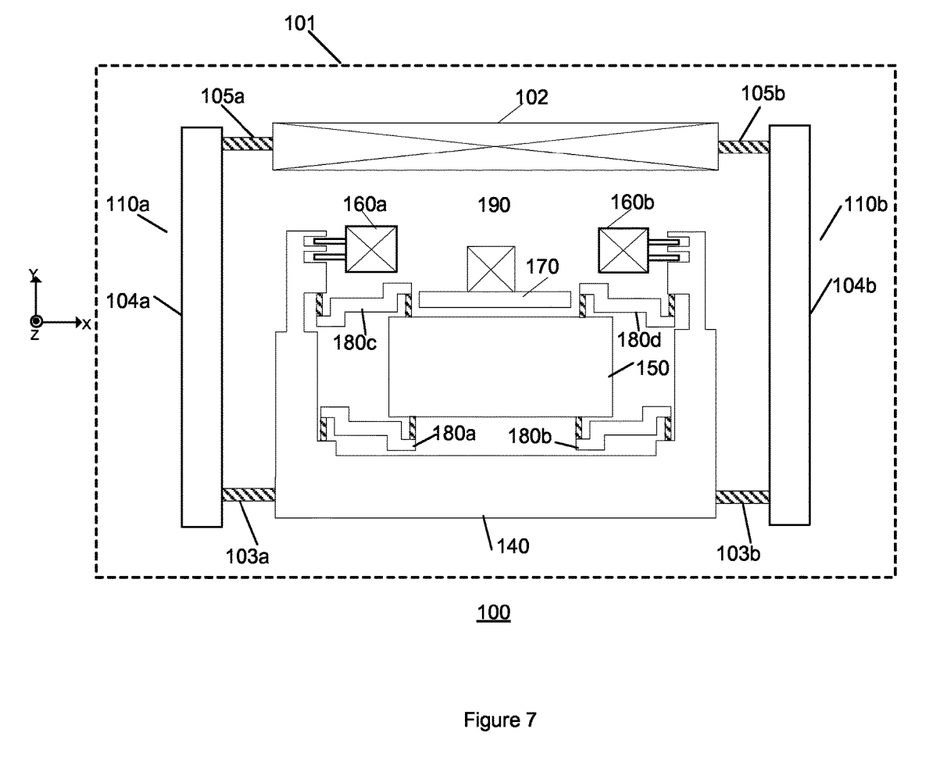
FIG. 7 illustrates a yaw gyroscope in accordance with an embodiment.

FIG. 7 illustrates a yaw gyroscope 100 in accordance with an embodiment. The yaw gyroscope 100 comprises a guided mass system 190 which includes the spring systems 110a and 110b, drive mass 140 and proof mass 150 on a substrate 101. Spring systems 110a and 110b comprise the flexible elements 103a-b and 105a-b, and the rigid lever arms 104a and 104b. The gyroscope 100 is supported by the flexible elements 105a and 105b each of which extends from a support anchor 102 attached to a substrate 101. Spring systems 110a and 110b are coupled to the drive mass 140 by the flexible elements 103a and 103b. The proof-mass 150 is flexibly connected to the drive mass 140 via sense spring systems 180a-180d. Sense spring systems 180a-180d are stiff in the X-direction such that when the guided mass system 190 is driven, the proof mass 150 also translates with the drive mass 140 in the X-direction.

The guided mass system 190 is driven into oscillation by the electrostatic drive comb structures 160a and 160b which are coupled to an alternating voltage source. Similar comb structures (not shown) may be capacitive sensors that are transducers for measuring the motion of the drive mass 140. When the guided mass system is oscillating, the drive mass 140 and the proof-mass 150 oscillate in the X-direction. Angular velocity about a Z-axis will cause a Coriolis force to act on the proof mass 150 in the Y-direction resulting in motion of the proof mass 150 in the Y-direction. A transducer 170 is used to sense the motion of the proof mass 150 in the Y-direction which provides a measure of the angular velocity about the Z-input axis. The transducer 170 may be an electrode that forms a capacitance to the proof-mass 150, wherein the capacitance changes as a result of the proof-mass motion.

Imperfections in the fabrication process can cause the flexible elements 103a and 103b, 105a and 105b to have non vertical cross sections in the gyroscope 100 configuration shown in FIG. 7. Even if the flexible elements 103a and 103b, 105a and 105b have a non-vertical cross section, the drive mass 140 and the proof-mass 150 will move in the X-direction and the out-of plane motion is minimized due to spring system 110a and 110b. Consequently, the non-ideal response of the yaw gyroscope 100 to the angular velocity about the X-axis, is reduced compared to gyroscopes using conventional springs. The yaw gyroscope 100 will not respond to the angular velocity about the X axis and will not have cross-axis sensitivity Since the yaw gyroscope 100 given in FIG. 7 is oscillated along the X-axis during the drive motion, angular velocity about the Y-axis, causes a Coriolis force in the Z-direction on the proof mass 150. Even if the flexible elements of the spring systems 180a-180d have a non-vertical cross section, the Coriolis force in the Z-direction causes the proof-mass to move only in the Z-direction but not in the Y-direction since the spring system 180a-180d prevents the coupling of forces in the Z-direction to motion in the Y-direction. In this manner, the yaw gyroscope 100 will not respond to the angular rate about the Y axis and will not have cross-axis sensitivity.

Figure 8:
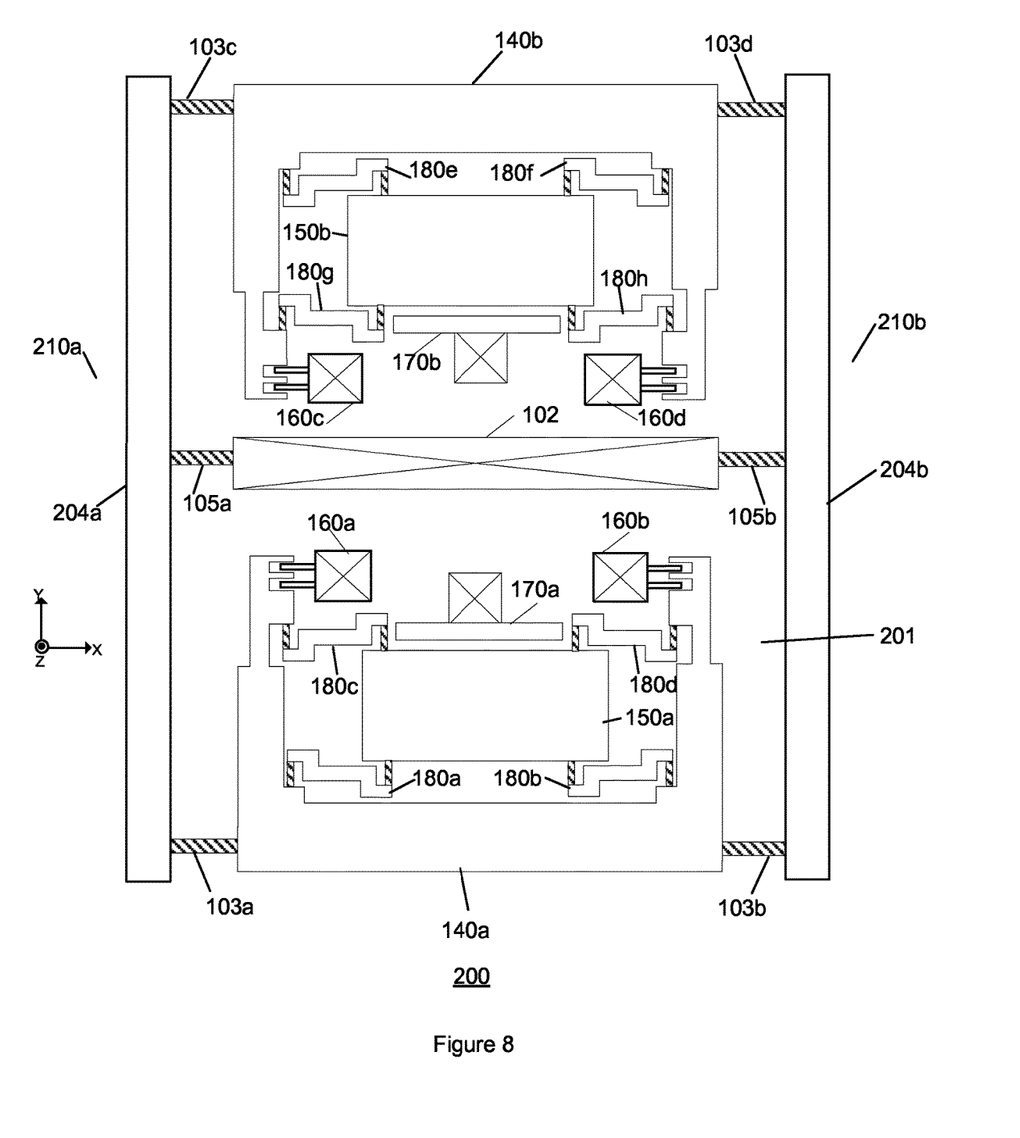
FIG. 8 illustrates a second embodiment of a yaw gyroscope in accordance with an embodiment.

FIG. 8 illustrates a second embodiment of a yaw gyroscope comprising a guided mass system 200 in accordance with the present invention. The guided mass system 200 comprises a symmetric guided mass system 201 which includes spring systems 210a and 210b, drive masses 140a and 140b, and proof masses 150a and 150b. Spring systems 210a and 210b comprise the drive flexures 105a and 105b, 103a-103d and the rigid lever arms 204a and 204b. Spring systems 210a and 210b are coupled to the drive masses 140a and 140b by the springs 103a, 103c and 103b, 103d, respectively. The proof-masses 150a and 150b are flexibly connected to the drive masses 140a and 140b via sense springs 180a-180d and 180e-180h, respectively. When the guided mass system 200 is driven into oscillation by the AC voltage coupled to the comb drive structures 160a-160d, the drive masses 140a and 140b and the proof masses 150a and 150b translate anti-phase in the X-direction.

Angular velocity about the Z-input axis will cause Coriolis forces to act on the proof masses 150a and 150b resulting in motion of the proof masses 150a and 150b anti-phase along the Y-direction. The amplitude of the motion of the proof masses along the Y-direction is proportional to the angular velocity. Transducers 170a and 170b are used to sense the motion of the respective proof masses 150a and 150b along the Y-direction.

Similar to the previous embodiment, spring systems 210a and 210b reduce the cross-axis coupling between X-direction and Z-direction deflections. Hence even if the flexible elements have a non-vertical cross-section, when the guided mass system is driven into oscillation, drive masses 140a and 140b and the proof-masses 150a and 150b will oscillate only in the X-direction and unlike the conventional gyroscope the masses will not oscillate in the Z-direction. Consequently, the non-ideal response of the yaw gyroscope to the angular velocity about the X-axis, is reduced compared to gyroscopes using conventional springs.

Similar to the previous embodiment, spring systems 180a-180h prevent Z-directed Coriolis forces from causing Y-direction motion of proof-masses 150a and 150b. Hence, the yaw gyroscope will not respond to the angular rate about the Y axis and will not have cross-axis sensitivity.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A microelectromechanical system (MEMS) device comprising:
a proof mass system that includes a proof mass, the proof mass moves in a first direction in a plane in response to a force, and wherein the proof mass moves in the plane; and
a spring system comprising a first flexible element, a first rigid lever arm, a second rigid lever arm and a second flexible element, wherein the first flexible element, the first rigid lever arm, the second rigid lever arm and the second flexible element are disposed in the plane,
the first rigid lever arm being connected to the first flexible element, the second rigid lever arm being connected to the second flexible element, and the first flexible element and the second flexible element being connected to one another via an intervening support anchor distinct from the proof mass, and wherein the first flexible element and the second flexible element each have a longitudinal axis parallel to the first direction of motion and wherein when the proof mass moves in the first direction, the first flexible element and the second flexible element bend in the plane, and the first and second rigid lever arms rotate in the plane.

2. The MEMS device of claim 1, wherein the proof mass system comprises a transducer, wherein the transducer senses motion of the proof mass.

3. The MEMS device of claim 1, wherein the force is in response to gravity.

4. The MEMS device of claim 1, wherein the force is in response to acceleration of the MEMS device.

5. The MEMS device of claim 1, wherein the force is in response to a magnetic field.

6. The MEMS device of claim 1, wherein the force is a Coriolis force in response to angular velocity.

7. The MEMS device of claim 1, wherein the force is an electrostatic force.

8. The MEMS device of claim 1, further comprising third and fourth flexible elements, wherein the third flexible element connects the first rigid lever arm to the proof mass, wherein the fourth flexible element connects the second rigid lever arm to the proof mass, and wherein the third flexible element and the fourth flexible element each has a longitudinal axis parallel to the first direction of motion.

9. The MEMS device of claim 8, wherein the first flexible element and the third flexible element each has a midpoint aligned along an axis perpendicular to the first direction of motion and the second flexible element and the fourth flexible element each has a midpoint aligned along an axis perpendicular to the first direction of motion.

10. A microelectromechanical system (MEMS) device comprising:
- a proof mass;
- a spring system compliant in a first direction of motion and coupled to the proof mass, the spring system comprising a first flexible element; and
- a first rigid lever arm coupled to the first flexible element, a second rigid lever arm coupled to a second flexible element, and the first flexible element and the second flexible element being coupled to one another via an intervening support anchor distinct from the proof mass, wherein the first flexible element and the second flexible element each have a longitudinal axis parallel to the first direction of motion, wherein the proof mass and the spring system are disposed in a plane, and wherein the proof mass moves in the first direction of motion in the plane in response to a force.

* * * * *